(12) United States Patent
Fish et al.

(10) Patent No.: US 9,163,772 B2
(45) Date of Patent: Oct. 20, 2015

(54) VACUUM INSULATED CRYOGENIC FLUID TRANSFER HOSE

(75) Inventors: Roger B. Fish, Bedford, MA (US); Michael D. Santorella, Peabody, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 271 days.

(21) Appl. No.: 13/540,271

(22) Filed: Jul. 2, 2012

(65) Prior Publication Data

US 2014/0001747 A1  Jan. 2, 2014

(51) Int. Cl.
*F16L 59/21* (2006.01)
*F16L 27/11* (2006.01)
*F16L 59/065* (2006.01)
*F16L 59/18* (2006.01)
*F16L 59/14* (2006.01)

(52) U.S. Cl.
CPC ............. *F16L 59/065* (2013.01); *F16L 59/141* (2013.01); *F16L 59/18* (2013.01); *Y10T 137/0402* (2015.04)

(58) Field of Classification Search
USPC ......... 285/47–49, 53, 145.1, 145.4, 223–226, 285/229, 298–301, 904
See application file for complete search history.

(56) References Cited

U.S. PATENT DOCUMENTS

| | | | | |
|---|---|---|---|---|
| 1,586,725 A * | 6/1926 | Westinghouse et al. | ....... | 285/279 |
| 1,702,066 A * | 2/1929 | Valentine | ....... | 285/299 |
| 2,793,058 A * | 5/1957 | Jacobson | ....... | 285/15 |
| 3,319,979 A * | 5/1967 | Herold et al. | ....... | 285/24 |
| 3,344,803 A * | 10/1967 | Testard et al. | ....... | 137/375 |
| 3,986,341 A * | 10/1976 | DeHaan | ....... | 62/50.7 |
| 5,048,847 A * | 9/1991 | Kovacs et al. | ....... | 277/318 |
| 6,533,334 B1 * | 3/2003 | Bonn | ....... | 285/145.5 |

* cited by examiner

*Primary Examiner* — Aaron Dunwoody
*Assistant Examiner* — Fannie Kee (57) ABSTRACT

A vacuum insulated cryogenic fluid transfer hose provides a fluid conduit and high-pressure fitting with a highly-insulative vacuum jacket which enables convenient access to the fitting. An interface collar is mounted to an end of the transfer hose with the fluid conduit and the fitting extending therethrough, a bellows fastened at a first end to an interior of the interface collar and fastened at a second end to a pass-through collar, a slide cuff mounted to the pass-through collar and extending over the bellows and the interface collar, and a connecting nut mounted to the pass-through collar. The slide cuff is displaceable relative to the interface collar between a retracted position, wherein the connecting nut, the pass-through collar, and the bellows are retracted to expose and provide access to the fitting, and an extended position, wherein the fitting is entirely covered by the enclosure.

11 Claims, 9 Drawing Sheets

VACUUM INSULATED CRYOGENIC FLUID TRANSFER HOSE

FIELD OF THE DISCLOSURE

The disclosure relates generally to connective fittings for fluid transfer hoses, and more particularly to a retractable, vacuum insulated enclosure for a high-pressure fluid transfer hose fitting.

BACKGROUND OF THE DISCLOSURE

Cryogenic transfer hoses, such as may be employed for transferring cryogenic gases and liquids to and from cryogenic tanks and modules, require substantial insulation for mitigating cooling losses and preventing the formation of condensation and ice on the hoses. Vacuums have been found to be very effective for providing cryogenic insulation. Thus, in order to achieve adequate insulation, conventional cryogenic transfer hoses are typically provided with a highly-insulative vacuum layer (commonly referred to as a "vacuum jacket") intermediate a fluid transfer conduit and an outer jacket.

A problem that is commonly associated with cryogenic transfer hoses is that connective fittings that are used to attach the fluid transfer conduits of such hoses to cryogenic tanks and modules must also be insulated. Vacuum jacketed fittings for such applications are well known in the art, but such fittings must employ bayonet-style connections or other low-pressure connective means that do not require tightening by tools, because the outer jackets of vacuum-insulated fittings preclude access by tools. Vacuum-jacketed, bayonet-style fittings typically have a pressure limit of 100 to 150 PSI, which is too low for refrigerant-based cooling loop applications that typically operate at pressures exceeding 400 PSI.

High-pressure cryogenic transfer hose fittings, such as fittings that employ threaded connective elements, are also known in the art, but such fittings do not employ vacuum jackets because they must be accessible by tools for mechanical tightening (i.e. for establishing tight connections that can withstand high pressures). High-pressure fittings are therefore left "naked" (i.e. uninsulated) until they are connected and tightened, after which they are manually wrapped in foam or other bulky insulating materials. Such insulating materials must be unwrapped or cut away before the fittings can be disconnected. In addition to being time-consuming, cumbersome, and wasteful, manual installation and removal of insulating materials can be impractical for high-pressure applications in which space is limited, such as where a plurality of hose connections are spaced in close proximity to one another.

In view of the forgoing, it would be advantageous to provide an enclosure for a high-pressure, cryogenic transfer hose fitting that employs a highly-insulative vacuum jacket and that provides convenient access to the fitting for attachment and removal.

SUMMARY

In accordance with the present disclosure, there is provided a retractable, insulative enclosure for a fluid conduit and connective fitting of a fluid transfer hose. The enclosure may include a tubular interface collar mounted to the end of the outer jacket of the fluid transfer hose in an axially-abutting relationship therewith and forming an airtight seal therebetween. A tubular bellows is disposed within the interface collar and is fastened at a first longitudinal end to an interior of the interface collar. A second longitudinal end of the bellows is fastened to a pass-through collar positioned axially adjacent to the interface collar. A tubular slide cuff is mounted to the exterior of the pass-through collar and extends over the bellows and the interface collar. A connecting nut is rotatably mounted to the pass-through collar and is adapted to be removably connected to a connecting port of a fluid-holding structure. The slide cuff is axially displaceable relative to the interface collar between a retracted position, wherein the connecting nut, pass-through collar, and bellows are retracted to provide access to the connective fitting, and an extended position, wherein the fitting is entirely covered by the enclosure.

When using the enclosure to connect the fluid transfer hose to fluid-holding structure, such as a tank, an operator may manually grip and displace the slide cuff longitudinally relative to the interface cuff to the retracted position. The bellows is thereby axially compressed and the connecting nut, pass-through collar, and slide cuff are retracted to expose the fitting. The fitting is then moved into engagement with a complementary fitting of a fluid transfer conduit extending from the tank and is tightened thereupon. The exposed fitting can be accessed by a tool for tightening the fitting and establishing a high-pressure fluid connection between the hose and the tank.

After the fitting has been sufficiently tightened, the operator may manually grip and longitudinally displace the slide cuff relative to the interface cuff to an extended position, wherein the connecting nut engages a complementary connecting port on the tank. The bellows, slide cuff, and pass-through collar are thereby extended over the fluid conduit and the connected fittings. The connecting nut can then be fastened to the connecting port to secure the hose to the tank. Connected thusly, the enclosure provides an airtight conduit that surrounds the high-pressure fittings. Air can subsequently be evacuated from the enclosure and the fluid transfer hose by a vacuum device to create a highly-insulative vacuum jacket that surrounds the fluid conduits and the fittings.

An embodiment of the device disclosed herein can thus include a fluid transfer conduit terminating in a fitting, an outer jacket extending over the fluid transfer conduit, an interface collar mounted to an end of the outer jacket, a bellows coupled at a first end to the interface collar and coupled at a second end to a pass-through collar, a slide cuff mounted to the pass-through collar and extendable over a portion of the bellows and the interface collar, and a connecting nut coupled to the pass-through collar, the connecting nut adapted to be removably connected to a connecting port of a fluid-holding structure. The slide cuff may be axially displaceable relative to the interface collar between a retracted position and an extended position. In the retracted position the connecting nut, pass-through collar, and bellows may be retracted to provide access to the fitting.

An alternative embodiment of the device disclosed herein can include a fluid transfer conduit terminating in a high-pressure fitting, an outer jacket extending over the fluid transfer conduit, a bellows coupled at a first end to an end of the outer jacket in an axially-abutting relationship therewith and forming an airtight seal therebetween and coupled at a second end to a pass-through collar to form an airtight seal therebetween, where the bellows and the pass-through collar can be displaced relative to the outer jacket between a retracted position and an extended position, and a connecting nut coupled to the pass-through collar. The connecting nut may be adapted to be removably connected to a connecting port of a fluid-holding structure. In the retracted position the connecting nut, pass-through collar, and bellows may be retracted to provide access to the fitting A method is disclosed herein for connecting a fluid transfer hose to a fluid-holding structure. The method may comprise connecting a fluid transfer conduit of the fluid transfer hose to a fluid inlet conduit of the fluid-holding structure, longitudinally extending an insulative enclosure that extends from an end of the fluid transfer hose and that disposes the fluid transfer conduit about the fluid transfer conduit and the fluid inlet conduit, and coupling the insulative enclosure to the fluid-holding structure.

BRIEF DESCRIPTION OF THE DRAWINGS

By way of example, a specific embodiment of the disclosed device will now be described, with reference to the accompanying drawings, in which.

DETAILED DESCRIPTION

Referring to FIGS. 1-4, a cryogenic transfer hose fitting enclosure 10 (hereinafter referred to as "the enclosure 10") in accordance with the present disclosure is shown. For the sake of convenience and clarity, terms such as "front," "rear," "top," "bottom," "up," "down," "inwardly," "outwardly," "lateral," and "longitudinal" will be used herein to describe the relative placement and orientation of components of the enclosure 10, each with respect to the geometry and orientation of the enclosure 10 as it appears in FIG. 1. Said terminology will include the words specifically mentioned, derivatives thereof, and words of similar import.

The enclosure 10 may include an interface collar 12, a bellows 14, a pass-through collar 16, a slide cuff 18, a retaining collar 20, a connecting nut 22, and several thrust bushings 24, 26, and 28. Unless otherwise noted below, the components of the enclosure 10 may be formed of stainless steel or other metals, plastics, or composites that are suitably rigid, durable, resistant to corrosion, and capable of withstanding operating temperatures below about −196 degrees Centigrade without significant adverse effects.

The interface collar 12 of the enclosure 10 may be an elongated, substantially tubular member having a sidewall 30 that terminates at its lower end in an annular flange 32. The flange 32 may have an inner diameter that is smaller than the inner diameter of the sidewall 30 and that is substantially equal to the inner diameter of a vacuum-insulated hose 33 to which the enclosure is connected (as described in greater detail below). An annular mounting lip 34 may extend from a top of the flange 32, radially inward of the sidewall 30, for facilitating connection to the bellows 14 (as described below).

Figure 1:
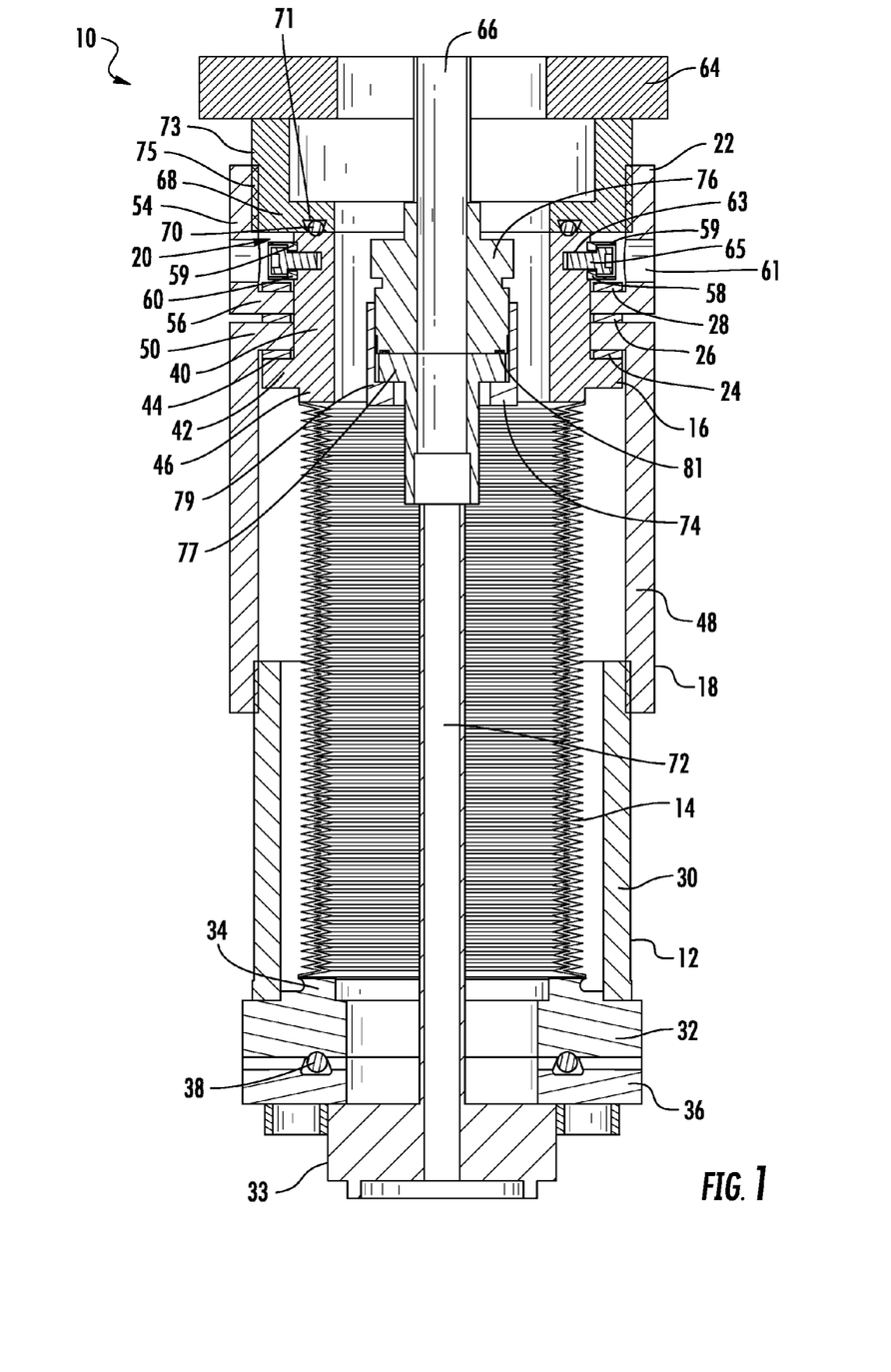
FIG. 1 is a side view in section illustrating an insulative enclosure in accordance with the present disclosure in an extended position.
Figure 2:
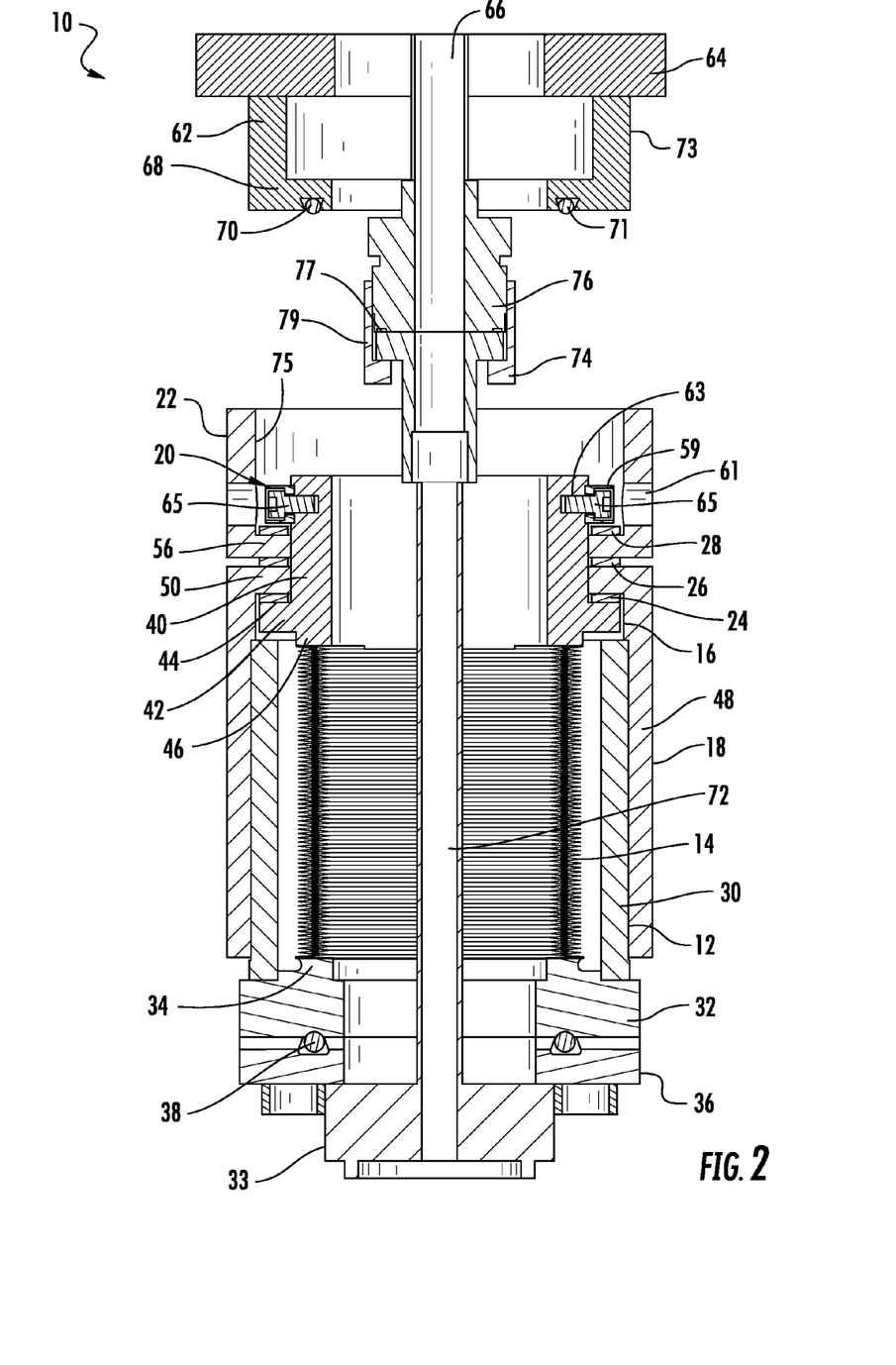
FIG. 2 is a side view in section illustrating the insulative enclosure shown in FIG. 1 in retracted position.
Figure 3:
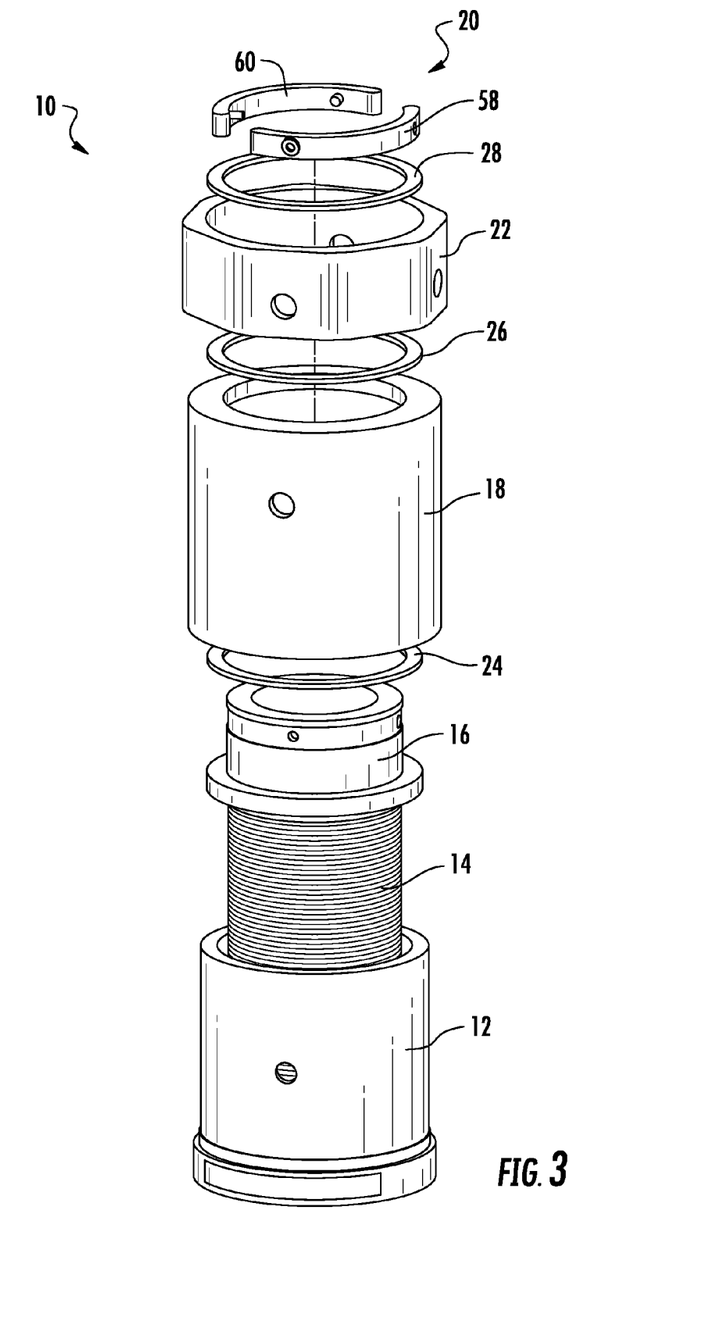
FIG. 3 is an exploded view illustrating the insulative enclosure shown in FIG. 1.
Figure 4:
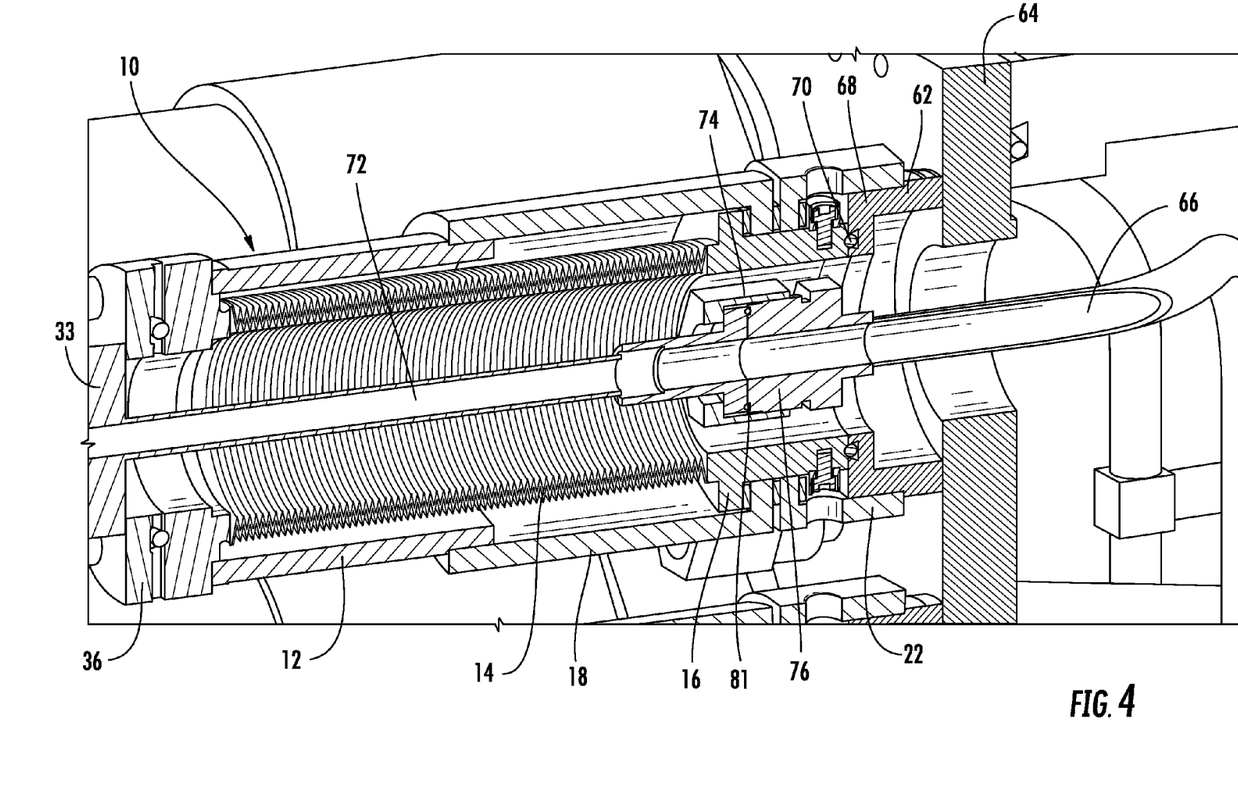
FIG. 4 is a perspective view in section illustrating the insulative enclosure shown in FIG. 1.

When operatively configured, the flange 32 of the interface collar 12 can be axially mounted to a connective flange 36 extending from the outer jacket of a conventional, vacuum-insulated hose 33, as shown in FIGS. 1, 2, and 4, such as by mechanical fasteners, adhesives, or other fastening means. An insulative O-ring 38 may be disposed in complementary annular channels formed in the abutting axial faces of the flanges 32 and 36 for establishing an air tight seal at the interface of the enclosure 10 and the hose 33. Alternatively, it is contemplated that the interface collar 12 may be formed as an integral extension of an outer jacket of a vacuum insulated hose.

The bellows 14 of the enclosure 10 may be a conventional bellows formed of stainless steel (e.g. austenitic stainless steel or precipitation hardening stainless steel) and having a circular cross-sectional shape. Alternatively it is contemplated that the bellows 14 can be formed of high temperature, nickel base, corrosion resistant alloys, titanium alloys, zirconium alloys, or any other material that is suitably flexible, resilient, and capable of withstanding operating temperatures below about −196 degrees Centigrade without significant adverse effects. The bellows 14 may have an outer diameter that is smaller than the inner diameter of the interface collar 12 and that is substantially equal to the outer diameter of the mounting lip 34. The bellows 14 may be disposed within the interface collar 12 in a substantially coaxial relationship therewith, and the bottom rim of the bellows 14 may be fastened to the mounting lip 34, such as with mechanical fasteners, adhesives, or welds, to form a continuous, airtight seal therebetween. Alternatively, it is contemplated that the mounting lip 34 can be omitted and that the bellows 14 can be fastened directly to the flange 32.

While the bellows 14 is shown as being a conventional, pleated bellows 14, it is contemplated that the bellows 14 can be any type of tubular member that defines a passageway therethrough and that is capable of being extended and retracted without substantial variation in its diameter. For example, it is contemplated that the bellows 14 can alternatively be a flexible tube having a non-pleated sidewall that axially folds or "doubles over" upon itself when the bellows 14 is retracted and is pulled substantially taught when the bellows 14 is extended.

The pass-through collar 16 of the enclosure may be a generally tubular member having a sidewall 40 that terminates at its lower end in a radially outwardly extending annular flange 42. The outer diameter of the flange 42 may be substantially equal to the outer diameter of the sidewall 30 of the interface collar 12. The flange 42 may form an annular shoulder 44 adjacent to the lower terminus of the pas-through collar 16. An annular thrust bushing 24 having an outer diameter substantially equal to the outer diameter of the flange 42 and having an inner diameter substantially equal to the outer diameter of the sidewall 40 may be seated atop the shoulder 44. The thrust bushing 24 may be formed of TEFLON or another low friction material.

An annular mounting lip 46 having an outer diameter substantially equal to the outer diameter of the bellows 14 may extend from a bottom of the flange 42 for facilitating connection to the bellows 14. Particularly, the mounting lip 46 may be fastened to the bellows 14 in manner similar to the mounting lip 34 of the interface collar 12, such as with mechanical fasteners, adhesives, or welds, to form a continuous, airtight seal there between. Alternatively, it is contemplated that the mounting lip 46 can be omitted and that the bellows 14 can be fastened directly to the flange 42.

The slide cuff 18 of the enclosure 10 may be an elongated, substantially tubular member having a sidewall 48 that terminates at its upper end in a radially inwardly extending annular flange 50. The sidewall 48 may have an inner diameter that is substantially equal to the outer diameter of the sidewall 30 of the interface collar 12. The flange 50 may have an inner diameter that is substantially equal to the outer diameter of the sidewall 40 of the pass-through collar 16. The slide cuff 18 may fit over the interface collar 12, the bellows 14, and the pass-through collar 16, as shown in FIGS. 1, 2, and 4, with the sidewall 40 of the pass-through collar 16 extending upwardly through the flange 50 of the slide cuff 18 and with a lower face of the flange 50 seated upon the thrust bushing 24 of the pass-through collar 16. An annular thrust bushing 26 that may be substantially identical to the thrust bushing 24 may be seated atop the flange 50, radially surrounding the sidewall 40 of the pass-through collar 16. Configured thusly, the inwardly facing surface of the sidewall 48 of the slide cuff 18 is disposed in a close clearance relationship with the outwardly facing surface of the sidewall 30 of the interface collar 12. The slide cuff 18 can therefore be longitudinally displaced or "slid" relative to the interface collar 12 with a minimal amount of lateral movement there between, as further described below. The exterior of the slide cuff 18 may be knurled, textured, coated with rubber, or otherwise provided with a moderate-to-high friction surface for facilitating secure manual engagement therewith.

The connecting nut 22 may be a substantially tubular member having a sidewall 54 that terminates at its lower end in a radially inwardly extending annular flange 56. The sidewall 54 may have an inner diameter that is substantially equal to the outer diameter of a connecting port 62 of a fluid holding structure 64 (described below), and may have a threaded, inwardly facing surface for engaging a threaded exterior of the connecting port 62 (as described below). The flange 56 may have an inner diameter that is substantially equal to the outer diameter of the sidewall 40 of the pass-through collar 16. The connecting nut 22 may fit over the pass-through collar 16 with the sidewall 40 of the pass-through collar 16 extending upwardly through the flange 56 of the connecting nut 22 and with a lower face of the flange 56 seated atop the thrust bushing 26. An annular thrust bushing 28 that may be substantially identical to the thrust bushings 24 and 26 may be seated atop the flange 56, radially inward of the sidewall 54 and radially surrounding the sidewall 40 of the pass-through collar 16.

The retaining collar 20 may be formed of a pair of segmental ribs 58 and 60. The ribs 58 and 60 are seated atop the thrust bushing 28 in the radial gap between the pass-through collar 16 and the connecting nut 22 in a diametrically-opposing relationship. Each rib 58 and 60 may have a pair of radially-extending apertures formed through it that are radially aligned with corresponding pass-through apertures in the connecting nut 22 and threaded fastening apertures in the pass-through collar 16. The ribs 58 and 60 may be mounted to the exterior of the pass-through collar 16 by threaded fasteners 65 that engage the threaded fastening apertures, as best shown in FIGS. 1 and 2 (the fasteners 65 may be extended through the pass-through apertures in the connecting nut 22 during assembly of the enclosure 10). When installed, the heads of the fasteners 65 may be disposed substantially flush with, or slightly radially inward of, the outwardly-facing surfaces of their respective ribs 58 and 60. Configured thusly, the retaining collar 20 secures the connecting nut 22 and the slide cuff 18 against longitudinal displacement relative to the pass-through collar 16 while allowing the connecting nut 22 to be freely rotated about a longitudinal axis relative to the pass-through collar 16 to facilitate tightening and loosening thereof.

While the retaining collar 20 is shown as having two segmental ribs 58 and 60, it is contemplated that the retaining collar 20 can alternatively be composed of a greater or fewer number of segments and/or can incorporate a greater or fewer number of apertures formed therethrough, with an appropriate number of corresponding pass-through and fastening apertures formed in the connecting nut 22 and pass-through collar 16. For example, it is contemplated that the retaining collar 20 can be composed of four segmental ribs, each rib having a single aperture. Alternatively, the retaining collar 20 can be formed of a single annular ring having a plurality of apertures. More broadly, it will be appreciated by those of ordinary skill in the art that many different mechanical arrangements can be implemented for restricting the movement of the connecting nut 22 and the slide cuff 18 in the manner described above. Such alternative structures are too numerous to list herein but may be substituted for the described structures without departing from the spirit and scope of the present disclosure.

To facilitate connection with the enclosure 10, it may generally be required that a cryogenic tank, module, or other fluid-holding structure to which the enclosure 10 is connected, such as the tank 64, be provided with a connecting port 62, as shown in FIGS. 1, 2 and 4. The connecting port 62 may be a substantially annular member that is rigidly mounted to the exterior of the tank 64, such as by welds. The connecting port 62 defines a vacuum conduit and provides a pass-through for a cryogenic fluid conduit 66 extending from within the tank 64. The connecting port 62 may terminate at its lower end in a radially-inwardly extending flange 68 having an inner diameter that is substantially equal to the inner diameter of the sidewall 40 of the pass-through collar 16. An insulative O-ring 70 may be disposed in an annular channel formed in the lower face of the flange 68 for forming an airtight seal at the juncture of the connecting port 62 and the pass-through collar 16 as further described below. The connecting port 62 may have a threaded exterior for threadedly engaging a threaded interior of the connecting nut 22 and establishing a secure connection therebetween. Alternatively, the connecting port 62 and connecting nut 22 may be configured to engage one another through a variety of other connecting means, including, but not limited to, friction fit and snap fit, for firmly securing the enclosure 10 to the exterior of the tank 64.

When the enclosure 10 is operatively mounted to the cryogenic transfer hose 33 as shown in FIGS. 1, 2, and 4, the cryogenic fluid transfer conduit 72 of the hose 33 may axially extend through the enclosure 10 and terminate in a high-pressure fitting 74. The high-pressure fitting 74 may be a threaded female fitting defined by a threaded connecting cuff that is rotatable relative to the fluid conduit 72 for facilitating rotational tightening and loosening of the cuff. Those having ordinary skill in the art will appreciate that many other varieties of high-pressure or medium-pressure fittings may be substituted for the fitting 74 without departing from the spirit and scope of the present disclosure. Such fittings include, but are not limited to, those sold under the names SWAGELOK VCR, PARKER Face-Seal w/metal O-rings, PARKER Triple-Lok 37°, PARKER SAE 45° Flare, and NPT Unions. The fitting 74 is preferably capable of withstanding operating pressures of at least 1000 PSI.

Figure 6:
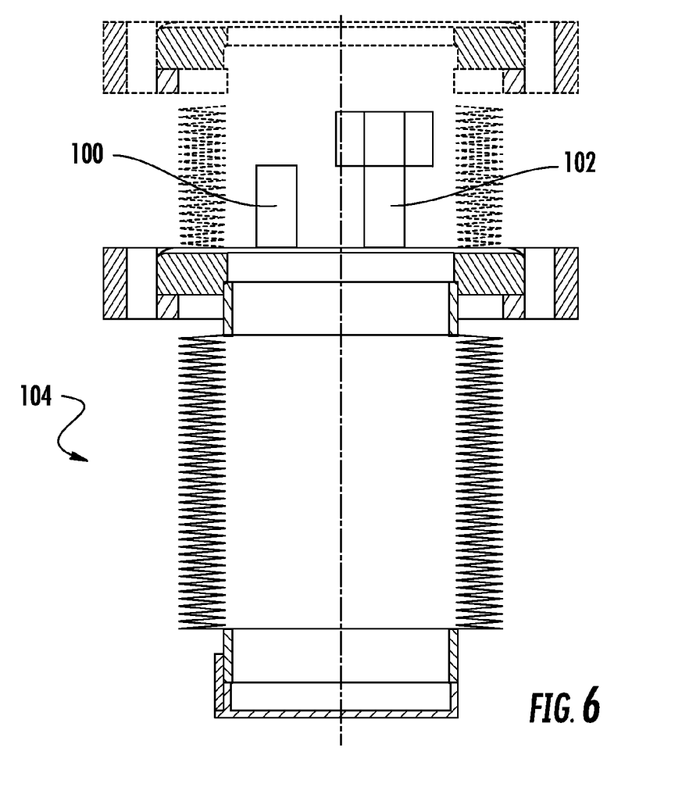
FIG. 6 is a side view illustrating a second alternative embodiment of the insulative enclosure shown in FIG. 1.

Referring to FIG. 6, an alternative embodiment of the enclosure 10 is shown wherein multiple fluid transfer conduits 100 and 102, such as a cryogenic fluid supply line and a cryogenic fluid return line, are disposed within a single enclosure 104 that is substantially similar to the enclosure 10. Such a multiple-conduit configuration is commonly referred to as "coaxial" or "triaxial" and provides the advantage of saving space relative to using two or more separate fluid conduits having their own enclosures.

Figure 7:
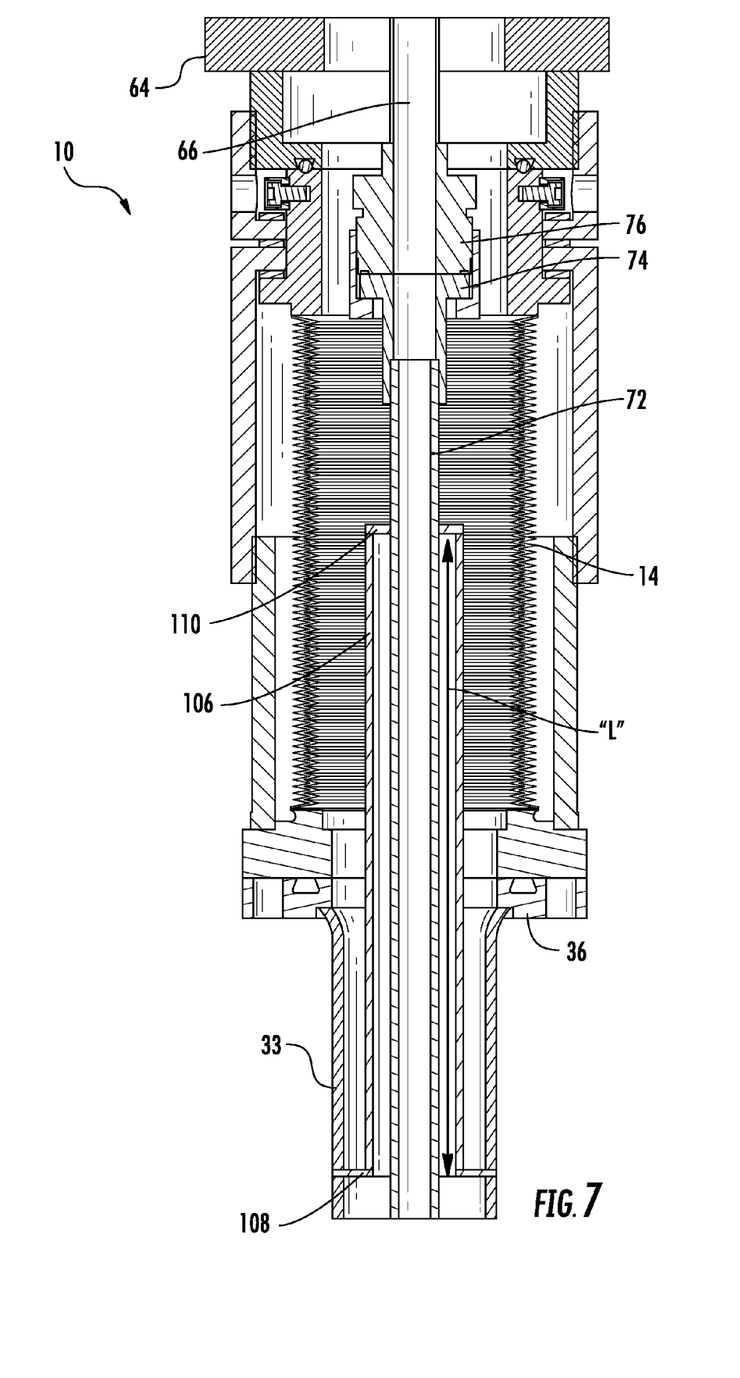
FIG. 7 is a side view in section illustrating a third alternative embodiment of the insulative enclosure shown in FIG. 1
Figure 8:
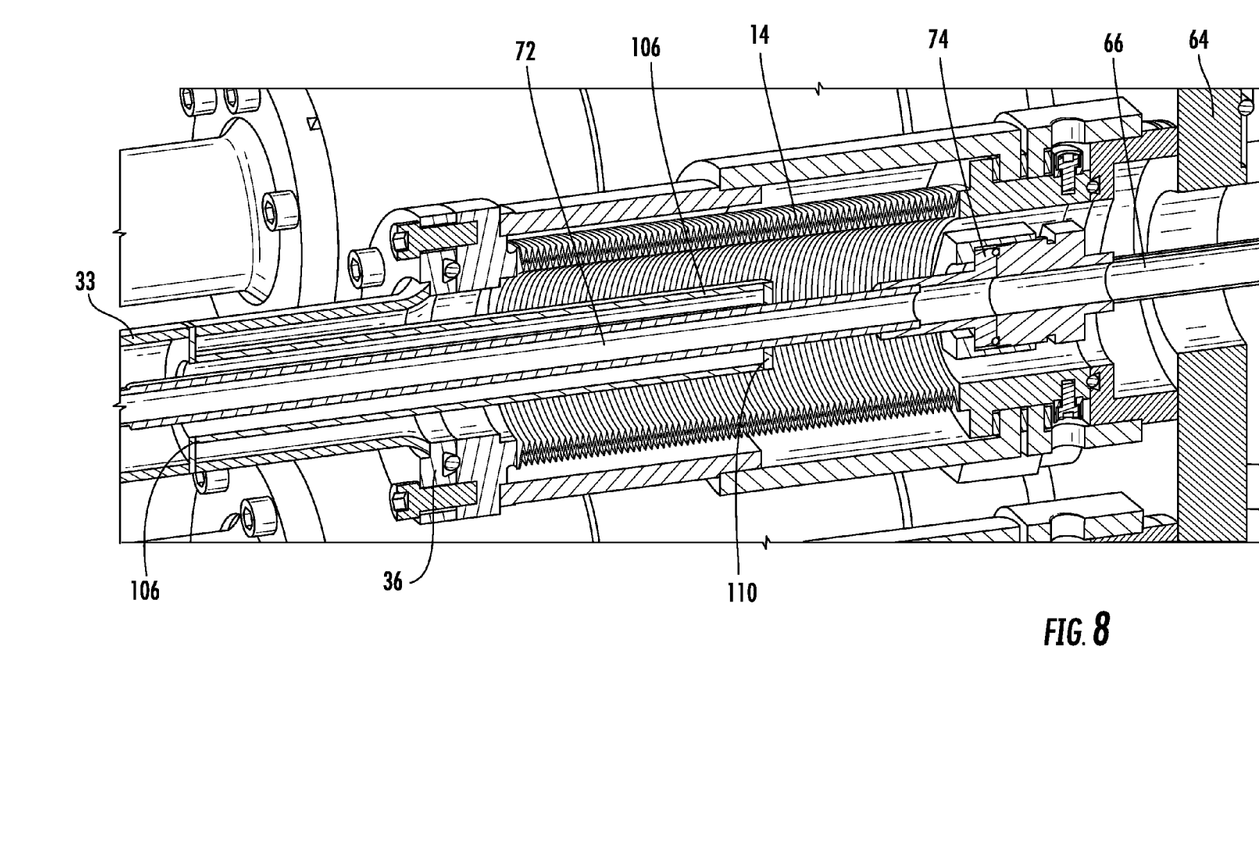
FIG. 8 is a perspective view in section illustrating the embodiment of the insulative enclosure shown in FIG. 7.

FIGS. 7 and 8 show a further alternative embodiment of the enclosure 10 in which a vacuum insulation extension 106 is provided around a portion of the cryogenic fluid transfer conduit 72 within the enclosure. As illustrated, the extension 106 may have a length "L" sufficient to cover substantially the entire length of the cryogenic fluid transfer conduit 72 within the enclosure 10. As shown, the extension terminates a short distance from the high-pressure fitting 74 used to couple the conduit to the cryogenic fluid conduit 66 extending from within the tank 64.

In the illustrated embodiment, the vacuum insulation extension 106 comprises a cylindrical member within which the fluid transfer conduit 72 is axially disposed. The extension 106 has a first end 108 coupled to a portion of the vacuum-insulated hose 33 adjacent to the connective flange 36. A second end 110 of the extension is coupled to an outer surface of the fluid transfer conduit. The extension 106 thus forms an annular space around a portion of the fluid transfer conduit 72 that can be evacuated from the hose side of the enclosure 10 (i.e., adjacent the second end 110 of the extension), thus providing an additional vacuum insulated space about the conduit. As will be appreciated, by providing this additional vacuum insulated space, heat leakage to the outer surface of the conduit 72 can be further minimized.

The first and second ends 108, 110 may be welded, brazed or otherwise fixed to the hose 33 and the fluid transfer conduit 72 in a fluid-tight manner. The extension 106 is illustrated as being cylindrical in shape, however, it will be appreciated that this shape is not critical, and other shapes can be used as long as they provide a vacuum annulus having desirable insulative properties.

Further, the illustrated embodiment shows the vacuum enclosure 106 having a length "L" sufficient to cover a substantial portion of the fluid transfer conduit 72 within the enclosure 10. It will be appreciated that the length "L" of the vacuum enclosure 106 can be selected so that a smaller portion of the fluid transfer conduit 72 is covered, as desired for a particular application.

Figure 9:
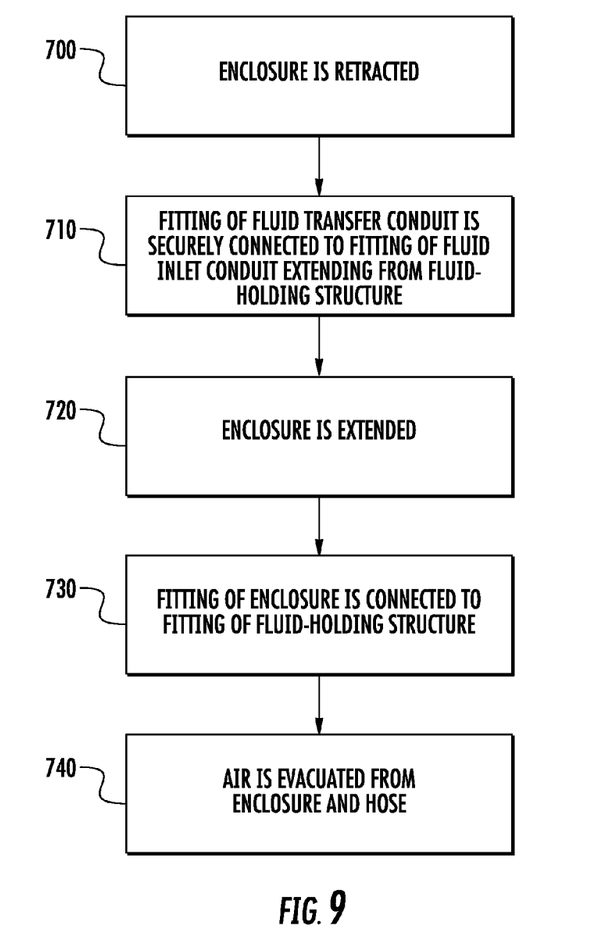
FIG. 9 is a flow diagram illustrating a method of using the insulative enclosure shown in FIG. 1.

Referring to the enclosure 10 as shown in FIG. 2, a method of using the enclosure 10, as generally outlined in FIG. 9, will now be described. When using the enclosure 10 to connect the hose 33 to the tank 64, an operator may manually grip and displace the slide cuff 18 longitudinally relative to the interface collar 12 to a refracted position (step 700). The bellows 14 is thereby compressed and the connecting nut 22, pass-through collar 16, and slide cuff 18 are retracted a distance of at least about one inch to expose the fitting 74. The female fitting 74 is then moved into engagement with a complementary male fitting 76 at the terminus of the cryogenic fluid transfer conduit 66 extending from the tank 64 and is tightened thereupon (step 710). Alternatively, it is contemplated that the fluid conduit 72 of the hose may terminate in a male fitting and the fluid conduit 66 extending from the tank 64 may terminate in a complementary female fitting. The retraction of the slide cuff 18 and resulting exposure of the fitting 74 allows the fitting 74 to be accessed by a tool, such as a wrench, for tightening the fitting 74 about the fitting 76 and establishing a high-pressure connection at the juncture of the fluid conduits 66 and 72.

Figure 5:
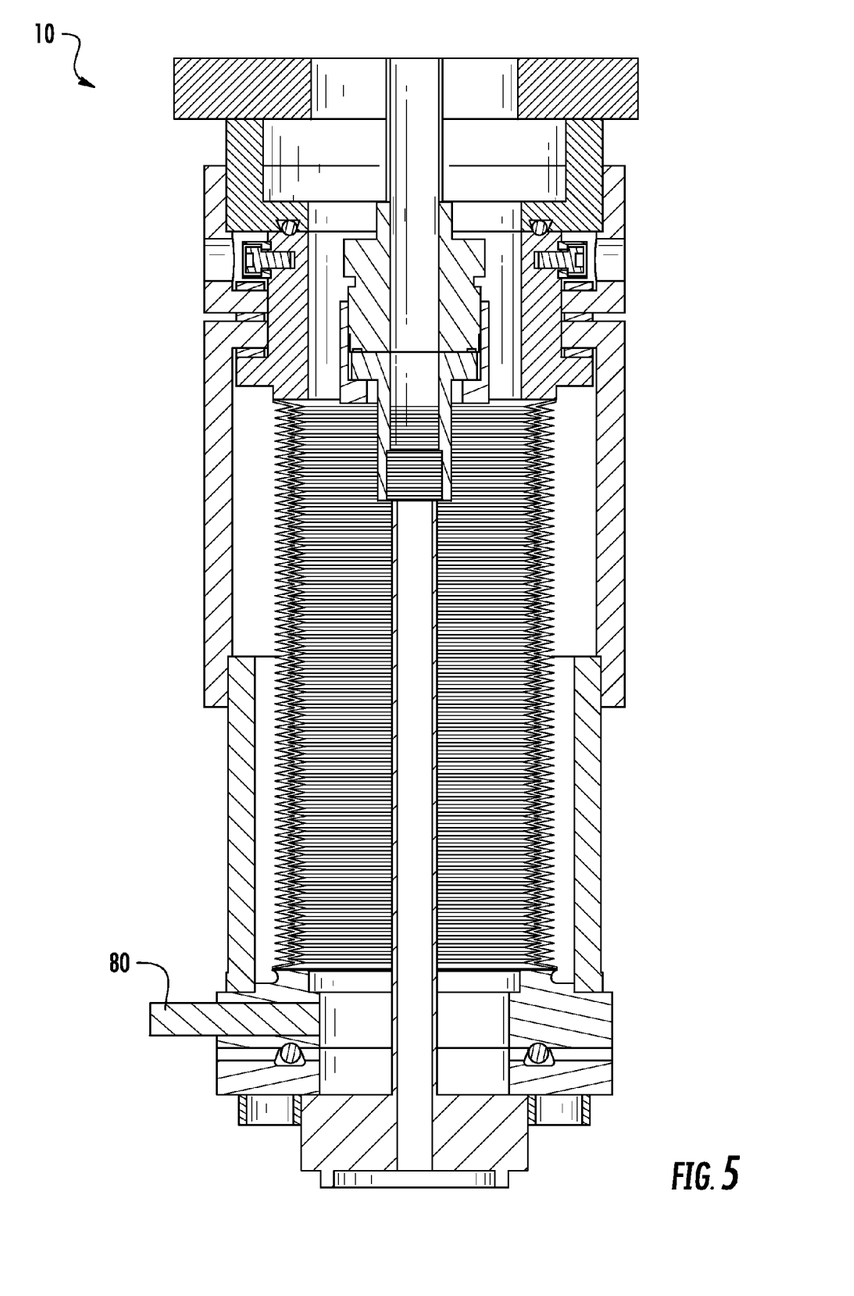
FIG. 5 is a side view in section illustrating a first alternative embodiment of the insulative enclosure shown in FIG. 1.

After the fitting 74 has been sufficiently tightened, the operator may manually grip and longitudinally displace the slide cuff 18 relative to the interface collar 12 to an extended position, as shown in FIGS. 1 and 4, wherein the connecting nut 22 engages the connecting port 62 (step 720). The bellows 14, slide cuff 18, and pass-through collar 16 are thereby extended over the fluid conduit 72 and the connected fittings 74 and 76. The connecting nut 22 can then be manually fastened to the connecting port 62, such as through threaded engagement (as described above), or by other connecting means that may be provided (step 730). Connected thusly, the enclosure 10 provides an airtight conduit that surrounds the high-pressure fittings 74 and 76 and extends between the hose 33 and the connecting port 62 of the tank 64. Air can subsequently be evacuated from the enclosure 10 and the hose 33 in a conventional manner, such by a vacuum device located within the tank 64 that is in fluid communication with the interior of the enclosure 10, to create a highly-insulative vacuum jacket that surrounds the fluid conduits 66 and 72 and the fittings 74 and 76 (step 740). Alternatively, referring to FIG. 5, it is contemplated that the enclosure 10 can itself be provided with a vacuum port 80 for facilitating connection with an external vacuum means (not shown) for evacuating air from the enclosure 10 and the hose 33.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A fluid transfer hose fitting enclosure comprising:
a fluid transfer conduit terminating in a fitting;
a hose extending over the fluid transfer conduit;
an interface collar mounted to an end of the hose;
a bellows coupled at a first end to the interface collar and coupled at a second end to a pass-through collar;
a slide cuff mounted to the pass-through collar and extendable over a portion of the bellows and the interface collar;
a connecting nut coupled to the pass-through collar and longitudinally separated from the slide cuff by a thrust bushing disposed longitudinally intermediate the connecting nut and the slide cuff, the connecting nut adapted to be removably connected to a connecting port of a fluid-holding structure;
a vacuum extension disposed about a portion of the fluid transfer conduit, the vacuum extension coupled at a first end to an outer surface of the fluid transfer conduit, the vacuum extension and the outer surface of the fluid transfer conduit forming an annular space open at a second end of the vacuum extension to enable removal of air from the annular space;
wherein the slide cuff is axially displaceable relative to the interface collar between a refracted position and an extended position; and
wherein, in the refracted position, the connecting nut, pass-through collar, and bellows are retracted to provide access to the fitting.

2. The fluid transfer hose fitting enclosure of claim 1, wherein, in the extended position, the fitting is covered by the pass-through collar.

3. The fluid transfer hose fitting enclosure of claim 1, wherein the connecting nut is rotatably mounted to the pass-through collar.

4. The fluid transfer hose fitting enclosure of claim 1, further comprising a retaining collar mounted to an exterior of the pass-through collar for minimizing axial displacement of the connecting nut and the slide cuff relative to the pass-through collar.

5. The fluid transfer hose fitting enclosure of claim 1, wherein the slide cuff fits over the interface collar in a radially close-clearance relationship therewith for minimizing radial displacement therebetween.

6. A fluid transfer hose fitting enclosure comprising:
- a fluid transfer conduit terminating in a high-pressure fitting;
- a hose extending over the fluid transfer conduit;
- a bellows adapted to be coupled at a first end to an end of the hose with an airtight seal therebetween and adapted to be coupled at a second end to a pass-through collar to form an airtight seal therebetween, wherein the bellows and the pass-through collar are displaceable relative to the end of the hose between a retracted position and an extended position; and
- a connecting nut coupled to the pass-through collar, wherein the connecting nut is adapted to be removably connected to a connecting port of a fluid-holding structure; and
- a vacuum extension disposed around a portion of the fluid transfer conduit, the vacuum extension and an outer surface of the fluid transfer conduit forming an annular space within at least a portion of the bellows;
- wherein, in the retracted position, the connecting nut, pass-through collar, and bellows are retracted to provide access to the fitting.

7. The fluid transfer hose fitting enclosure of claim 6, wherein, in the extended position, the fitting is covered by the pass-through collar.

8. The fluid transfer hose fitting enclosure of claim 6, wherein the connecting nut is rotatably mounted to the pass-through collar.

9. The fluid transfer hose fitting enclosure of claim 6, further comprising a retaining collar mounted to an exterior of the pass-through collar for minimizing axial displacement of the connecting nut relative to the pass-through collar.

10. The fluid transfer hose fitting enclosure of claim 6, further comprising a slide cuff mounted to the pass-through collar and extendable over a portion of the bellows, wherein the slide cuff fits over an interface collar in a radially close-clearance relationship therewith for minimizing radial displacement therebetween.

11. The fluid transfer hose fitting enclosure of claim 6, the vacuum extension coupled at a first end to the outer surface of the fluid transfer conduit, the annular space open at a second end of the vacuum extension to enable removal of air from the annular space.

\* \* \* \* \*